(12) United States Patent
Sugaya et al.

(10) Patent No.: US 11,923,775 B2
(45) Date of Patent: Mar. 5, 2024

(54) IN-VEHICLE POWER CONVERSION DEVICE

(71) Applicant: Mitsubishi Electric Corporation, Tokyo (JP)

(72) Inventors: Yuji Sugaya, Tokyo (JP); Kosuke Inoue, Tokyo (JP); Naoya Yabuuchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 34 days.

(21) Appl. No.: 17/284,126

(22) PCT Filed: Dec. 28, 2018

(86) PCT No.: PCT/JP2018/048537
§ 371 (c)(1),
(2) Date: Apr. 9, 2021

(87) PCT Pub. No.: WO2020/136886
PCT Pub. Date: Jul. 2, 2020

(65) Prior Publication Data
US 2021/0384834 A1 Dec. 9, 2021

(51) Int. Cl.
*H02M 3/28* (2006.01)
*B60R 16/03* (2006.01)
*H02M 3/00* (2006.01)

(52) U.S. Cl.
CPC ............... *H02M 3/28* (2013.01); *B60R 16/03* (2013.01); *H02M 3/003* (2021.05)

(58) Field of Classification Search
CPC ............ H02M 3/22; H02M 3/24; H02M 3/28; H02M 3/315; H02M 3/3155; H02M 3/335;
(Continued)

(56) References Cited

U.S. PATENT DOCUMENTS 9,584,010 B2 * 2/2017 Hatakenaka ............ H02M 1/44
2010/0164670 A1 7/2010 Nakahori et al.
(Continued)

FOREIGN PATENT DOCUMENTS

JP 2002-369527 A 12/2002
JP 2005-45945 A 2/2005
(Continued)

OTHER PUBLICATIONS

English translation of JP 2008271645. (Year: 2008).*
(Continued)

*Primary Examiner* — Thienvu V Tran
*Assistant Examiner* — Carlos O Rivera-Perez
(74) *Attorney, Agent, or Firm* — Sughrue Mion, PLLC; Richard C. Turner

(57) ABSTRACT

Provided is an in-vehicle power conversion device in which a smoothing capacitor includes a first electrical connection portion, a second electrical connection portion, a mechanical connection portion, and a smoothing capacitor main body. The first electrical connection portion is electrically connected to a first conductor. The second electrical connection portion is electrically connected to a second conductor. The mechanical connection portion functions as an additional electrical connection portion configured to fix the smoothing capacitor main body to the first conductor or the second conductor to be electrically connected to a fixing destination of the smoothing capacitor main body.

11 Claims, 6 Drawing Sheets

(58) Field of Classification Search
CPC ......... H02M 3/33569; H02M 3/33571; H02M 3/33573; H02M 3/33576; H02M 3/33584; H02M 3/33592; H02M 3/003; H02M 1/14; H02M 1/143; H02M 1/15; H02M 1/34–348; H02M 1/44; H02M 7/003; H02M 7/5387; B60R 16/02; B60R 16/03; B60R 16/033; B60R 16/04; H01F 27/28; H01F 27/2847; H01F 27/40; H01F 2027/40; H01F 2027/408; H01G 2/00; H01G 2/02; H01G 2/04; H01G 2/06; H01G 2/065; H01G 4/00; H01G 4/002; H01G 4/228–252; H01G 4/40
USPC ......... 363/15–21.3, 35, 37, 44–48, 123–127, 363/131–134, 144, 146, 147; 361/306.1–310

See application file for complete search history.

(56) References Cited

U.S. PATENT DOCUMENTS

| | | | | |
|---|---|---|---|---|
| 2011/0149467 A1* | 6/2011 | Azuma | ................ | B60W 20/00 361/306.2 |
| 2011/0242725 A1 | 10/2011 | Herrmann et al. | | |
| 2012/0267152 A1 | 10/2012 | Hara et al. | | |
| 2014/0240946 A1* | 8/2014 | Fukumasu | .............. | B60L 58/20 361/811 |
| 2014/0321065 A1* | 10/2014 | Nishimura | ........... | H05K 7/1432 361/722 |
| 2020/0267871 A1* | 8/2020 | Takahara | ................ | H01F 27/24 |

FOREIGN PATENT DOCUMENTS

| | | |
|---|---|---|
| JP | 2008-271645 A | 11/2008 |
| JP | 2011-146459 A | 7/2011 |
| JP | 2013-99057 A | 5/2013 |
| JP | 5255577 B2 | 8/2013 |
| JP | 5434757 B2 | 3/2014 |
| JP | 2015-156461 A | 8/2015 |
| JP | 6239208 B1 | 11/2017 |
| WO | 2015/163143 A1 | 10/2015 |
| WO | 2016/045752 A1 | 3/2016 |
| WO | 2018/185905 A1 | 10/2018 |
| WO | 2018/193589 A1 | 10/2018 |

OTHER PUBLICATIONS

English translation of WO 2015/163143. (Year: 2015).*
English translation of JP 2002369527. (Year: 2002).*
International search report for PCT/JP2018/048537 dated Mar. 12, 2019.
Notice of Reasons for Refusal dated Aug. 31, 2021 by the Japanese Patent Office in Japanese Application No. 2020-562281.
Extended European Search Report dated Nov. 25, 2021 in Application No. 18944453.2.

* cited by examiner

IN-VEHICLE POWER CONVERSION DEVICE

CROSS-REFERENCE TO RELATED APPLICATIONS

This application is a National Stage of International Application No. PCT/JP2018/048537 filed Dec. 28, 2018.

TECHNICAL FIELD

The present invention relates to an in-vehicle power conversion device that includes a transformer.

BACKGROUND ART

A plurality of types of power conversion device are generally mounted, together with a high-voltage battery, to an electrically powered vehicle such as an electric vehicle and a hybrid vehicle. Hitherto, there has been known a power conversion device configured to use a rectifier element to rectify an AC voltage supplied from a transformer into a pulsating voltage, and to use a choke coil and a smoothing capacitor to smooth the pulsating voltage rectified by the rectifier element. The above-mentioned related-art power conversion device is downsized and manufacturing thereof is facilitated through integration of windings of the transformer, the choke coil, and the rectifier element into a component (for example, see Patent Literature 1 and Patent Literature 2).

CITATION LIST

Patent Literature

[PTL 1] JP 5255577 B2
[PTL 2] JP 5434757 B2

SUMMARY OF INVENTION

Technical Problem

A form of mounting the smoothing capacitor, which is a main component of the power conversion device, is not disclosed in Patent Literature 1 and Patent Literature 2. Thus, when the smoothing capacitor is arranged, for example, next to the integrated component in the related-art power conversion devices described in Patent Literature 1 and Patent Literature 2, lines connected to terminals of the smoothing capacitor are long, and impedances of the lines thus increase, resulting in a decrease in performance of the smoothing capacitor. When the performance of the smoothing capacitor decreases, a pulsating component of the pulsating voltage supplied from the rectifier element is not sufficiently removed by the smoothing capacitor, and electromagnetic compatibility (EMC) characteristics of the power conversion device deteriorate.

The present invention has been made in view of the above-mentioned problem, and has an object to provide an in-vehicle power conversion device which is capable of downsizing the in-vehicle power conversion device, facilitating manufacturing thereof, and suppressing a decrease in performance of a smoothing capacitor.

Solution to Problem

According to one embodiment of the present invention, there is provided an in-vehicle power conversion device including: a transformer including a primary winding and a secondary winding; an inverter circuit configured to supply a current to the primary winding; a control board configured to control the inverter circuit; a rectifier circuit configured to rectify an AC voltage generated in the secondary winding into a pulsating voltage; a smoothing circuit which includes a smoothing coil and a smoothing capacitor, and is configured to smooth the pulsating voltage rectified by the rectifier circuit; a first conductor and a second conductor to which the smoothing capacitor is electrically connected; a resin member configured to integrate the first conductor and the second conductor with each other under a state in which the first conductor and the second conductor are insulated from each other; and a housing which is conductive, wherein the smoothing capacitor includes a first electrical connection portion, a second electrical connection portion, a mechanical connection portion, and a smoothing capacitor main body in which the first electrical connection portion, the second electrical connection portion, and the mechanical connection portion are provided, wherein the first electrical connection portion is electrically connected to the first conductor, wherein the second electrical connection portion is electrically connected to the second conductor, and wherein the mechanical connection portion functions as an additional electrical connection portion configured to fix the smoothing capacitor main body to the first conductor or the second conductor so as to be electrically connected to a fixing destination of the smoothing capacitor main body.

Advantageous Effects of Invention

According to the in-vehicle power conversion device of the present invention, it is possible to downsize the in-vehicle power conversion device, facilitate manufacturing thereof, and suppress the decrease in performance of the smoothing capacitor.

DESCRIPTION OF EMBODIMENTS

Now, embodiments of the present invention are described with reference to the drawings.

First Embodiment

Figure 1:
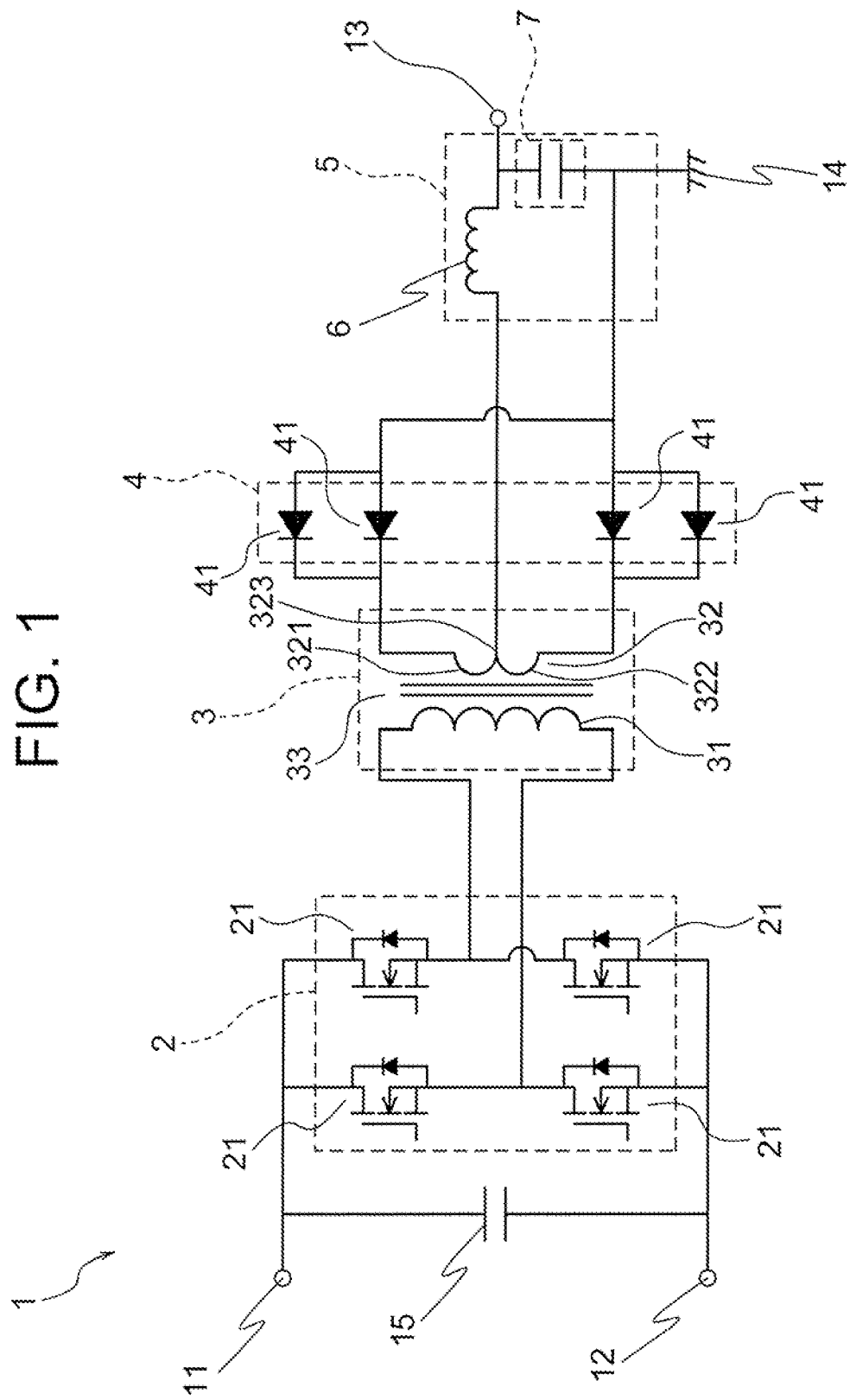
FIG. 1 is a circuit diagram for illustrating an in-vehicle power conversion device according to a first embodiment of the present invention.

FIG. 1 is a circuit diagram for illustrating an in-vehicle power conversion device according to a first embodiment of the present invention. In the figure, an in-vehicle power conversion device 1 is a power conversion device mounted to a vehicle such as an electric vehicle or a hybrid vehicle. In the in-vehicle power conversion device 1, a P-side input terminal 11, an N-side input terminal 12, and an output terminal 13 are provided. To the P-side input terminal 11 and the N-side input terminal 12, a DC power supply, for example, a high-voltage battery mounted to the vehicle, is electrically connected. In this embodiment, a DC-DC converter configured to convert a high voltage of the DC power supply to a low voltage functions as the in-vehicle power conversion device 1.

The in-vehicle power conversion device 1 includes an inverter circuit 2, a transformer 3, a rectifier circuit 4, a smoothing circuit 5, and a control board (not shown). Moreover, in the in-vehicle power conversion device 1, there is provided a primary-side capacitor 15 connected in parallel to the inverter circuit 2.

The inverter circuit 2 includes a plurality of switching elements 21 serving as primary-side semiconductor elements. The control board of the in-vehicle power conversion device 1 includes a control circuit configured to control the inverter circuit 2. The inverter circuit 2 switches the plurality of switching elements 21 through the control of the control board.

The transformer 3 includes a primary winding 31, a secondary winding 32, and a transformer core 33. In the transformer core 33, the primary winding 31 and the secondary winding 32 are provided. The transformer core 33 is a magnetic body that forms a magnetic circuit of the primary winding 31 and the secondary winding 32. As a result, the primary winding 31 and the secondary winding 32 are electromagnetically coupled to each other through intermediation of the transformer core 33.

The secondary winding 32 includes an upper secondary winding portion 321 and a lower secondary winding portion 322 which are connected in series to each other. The upper secondary winding portion 321 and the lower secondary winding portion 322 are connected to each other at a center tap portion 323.

The rectifier circuit 4 includes a plurality of rectifier diodes 41 serving as secondary-side semiconductor elements. A cathode terminal of each rectifier diode 41 is electrically connected to the secondary winding 32.

The smoothing circuit 5 is electrically connected to the center tap portion 323 and the rectifier circuit 4. Moreover, the smoothing circuit 5 includes a smoothing coil 6, a smoothing coil core (not shown), and a smoothing capacitor 7. The smoothing coil 6 is provided in the smoothing coil core. The smoothing coil core is a magnetic body that forms a magnetic circuit of the smoothing coil 6.

The smoothing coil 6 is electrically connected between the center tap portion 323 and the output terminal 13. The smoothing capacitor 7 is electrically connected between the output terminal 13 and a housing 14 which is conductive. The housing 14 is electrically connected to a frame of a vehicle body corresponding to a ground of the vehicle. The housing 14 serves as a negative terminal on an output side of the in-vehicle power conversion device 1. The smoothing capacitor 7 is electrically connected between the rectifier circuit 4 and the output terminal 13.

The DC current at the high voltage supplied from the DC power supply to the P-side input terminal 11 and the N-side input terminal 12 is accumulated in the primary-side capacitor 15. After that, a DC voltage from the primary-side capacitor 15 is inverted to an AC voltage through switching operations of the plurality of switching elements 21 in the inverter circuit 2. After that, the AC voltage from the inverter circuit 2 is supplied to the primary winding 31 of the transformer 3. In the transformer 3, the AC voltage from the inverter circuit 2 is converted to an AC voltage in accordance with a turn ratio between the primary winding 31 and the secondary winding 32. After that, the AC voltage generated in the secondary winding 32 is rectified into a pulsating voltage by the rectifier diodes 41 of the rectifier circuit 4. After that, the pulsating voltage rectified by the rectifier circuit 4 is smoothed by the smoothing circuit 5. A DC power smoothed by the smoothing circuit 5 is supplied to a lead battery mounted to the vehicle and in-vehicle devices of an accessary system via the output terminal 13.

Figure 2:
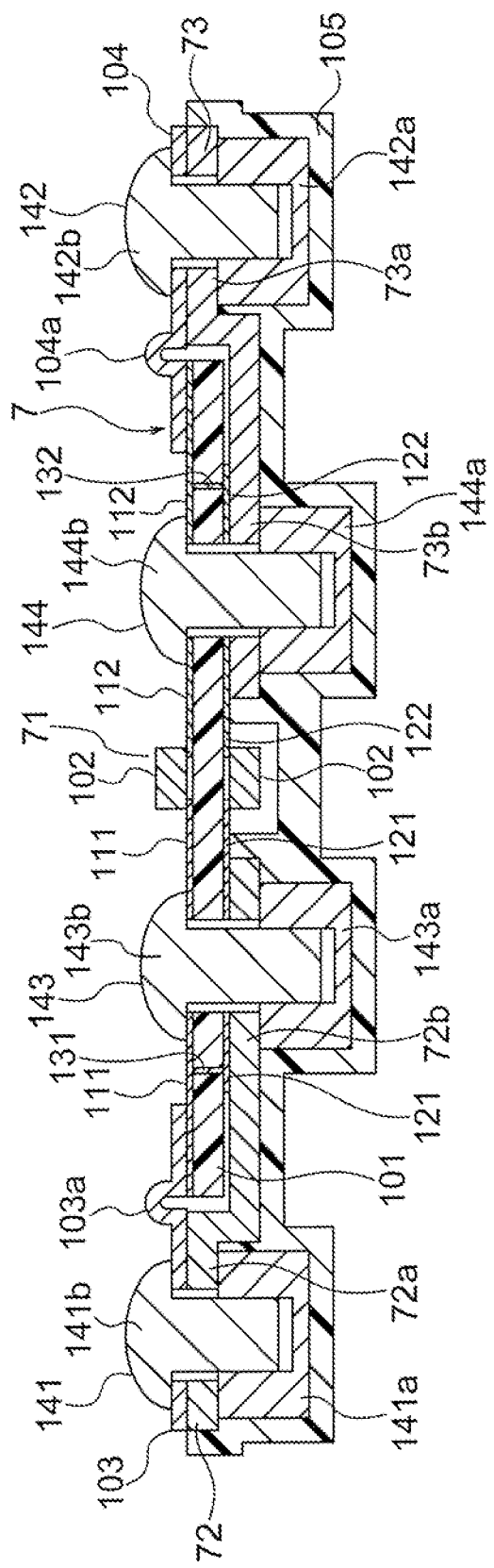
FIG. 2 is a cross-sectional view for illustrating a smoothing capacitor of FIG. 1.

FIG. 2 is a cross-sectional view for illustrating the smoothing capacitor 7 of FIG. 1. In the smoothing capacitor 7, a plurality of capacitor elements 102, a first terminal member 103, and a second terminal member 104 are mounted to a small board 101 by reflow soldering. The small board 101 is a board different from the control board configured to control the inverter circuit 2. Each capacitor element 102 is a surface mount ceramic capacitor element that has a first electrode and a second electrode. Moreover, the plurality of capacitor elements 102 are mounted to a front surface and a rear surface of the small board 101, respectively. In the smoothing capacitor 7, a smoothing capacitor main body 71 is formed of the small board 101 and the plurality of capacitor elements 102.

The first terminal member 103 is electrically connected, through intermediation of a first front surface pattern 111, to the first electrode of each capacitor element 102 mounted to the front surface of the small board 101. The second terminal member 104 is electrically connected, through intermediation of a second front surface pattern 112, to the second electrode of each capacitor element 102 mounted to the front surface of the small board 101.

A first rear surface pattern 121 and a second rear surface pattern 122 are provided on the rear surface of the small board 101. The first rear surface pattern 121 is electrically connected to the first front surface pattern 111 through a first through via 131 which passes through the small board 101. Moreover, the first rear surface pattern 121 is electrically connected to the first electrode of each capacitor element 102 mounted to the rear surface of the small board 101.

The second rear surface pattern 122 is electrically connected to the second front surface pattern 112 through a second through via 132 which passes through the small board 101. Moreover, the second rear surface pattern 122 is electrically connected to the second electrode of each capacitor element 102 mounted to the rear surface of the small board 101.

The in-vehicle power conversion device 1 includes a first conductor 72 and a second conductor 73 to which the smoothing capacitor 7 is electrically connected. Moreover, a part of each of the first terminal member 103 and the second terminal member 104 protrudes, as a protruding end portion, toward the outside from the small board 101.

The first conductor 72 includes a first conductor portion 72a for terminal and a first additional conductor portion 72b. The first conductor portion 72a for terminal is arranged on a rear side of the protruding end portion of the first terminal member 103. The first additional conductor portion 72b extends from the first conductor portion 72a for terminal toward the rear side of the small board 101.

The second conductor 73 includes a second conductor portion 73a for terminal and a second additional conductor portion 73b. The second conductor portion 73a for terminal is arranged on a rear side of the protruding end portion of the second terminal member 104. The second additional conductor portion 73b extends from the second conductor portion 73a for terminal toward the rear side of the small board 101.

The first terminal member 103 is connected to the first conductor portion 72a for terminal by a first terminal fixture 141. As a result, the first terminal member 103 and the first terminal fixture 141 form a first electrical connection portion electrically connected to the first conductor portion 72a for terminal. The first terminal fixture 141 is a tightening device that includes a nut 141a and a screw 141b.

The second terminal member 104 is connected to the second conductor portion 73a for terminal by a second terminal fixture 142. As a result, the second terminal member 104 and the second terminal fixture 142 form a second electrical connection portion electrically connected to the second conductor portion 73a for terminal. The second terminal fixture 142 is a tightening device that includes a nut 142a and a screw 142b.

A middle portion of the first terminal member 103 is an elastically deformable kink portion 103a. When the first terminal member 103 is connected to the first conductor portion 72a for terminal, stress applied to a mounting portion of the small board 101 by the first terminal member 103 is mitigated by the elastic deformation of the kink portion 103a.

A middle portion of the second terminal member 104 is an elastically deformable kink portion 104a. When the second terminal member 104 is connected to the second conductor portion 73a for terminal, stress applied to a mounting portion of the small board 101 by the second terminal member 104 is mitigated by the elastic deformation of the kink portion 104a.

The first electrical connection portion is connected to the first conductor 72 by tightening the nut 141a and the screw 141b, and thus functions as a highly reliable electrical connection portion. Moreover, the second electrical connection portion is also connected to the second conductor 73 by tightening the nut 142a and the screw 142b, and thus functions as a highly reliable electrical connection portion.

Meanwhile, the kink portions 103a and 104a exist in the first electrical connection portion and the second electrical connection portion, respectively, and thus do not fully function as mechanical connection portions for mechanically fixing the smoothing capacitor main body 71 to the first conductor 72 and the second conductor 73, respectively.

Thus, the small board 101 is fixed to the first additional conductor portion 72b by a first body fixture 143. With this configuration, a mechanical strength of fixing the smoothing capacitor main body 71 to the first conductor 72 is secured. The first body fixture 143 is a tightening device that includes a nut 143a and a screw 143b. The screw 143b is inserted through a through hole formed in the small board 101 and the first additional conductor portion 72b.

The first rear surface pattern 121 is brought into contact with a fixing destination of the smoothing capacitor main body 71, that is, the first additional conductor portion 72b, by fixing the smoothing capacitor main body 71 to the first additional conductor portion 72b. As a result, the first rear surface pattern 121 is electrically connected to the first additional conductor portion 72b.

That is, a first mechanical connection portion formed of the first body fixture 143 and the first rear surface pattern 121 functions as an additional electrical connection portion configured to fix the smoothing capacitor main body 71 to the first additional conductor portion 72b so as to be electrically connected to the first additional conductor portion 72b.

Further, the small board 101 is fixed to the second additional conductor portion 73b by a second body fixture 144. With this configuration, a mechanical strength of fixing the smoothing capacitor main body 71 to the second conductor 73 is secured. The second body fixture 144 is a tightening device that includes a nut 144a and a screw 144b. The screw 144b is inserted through a through hole formed in the small board 101 and the second additional conductor portion 73b.

The second rear surface pattern 122 is brought into contact with a fixing destination of the smoothing capacitor main body 71, that is, the second additional conductor portion 73b, by fixing the smoothing capacitor main body 71 to the second additional conductor portion 73b. As a result, the second rear surface pattern 122 is electrically connected to the second additional conductor portion 73b.

That is, a second mechanical connection portion formed of the second body fixture 144 and the second rear surface pattern 122 functions as an additional electrical connection portion configured to fix the smoothing capacitor main body 71 to the second additional conductor portion 73b so as to be electrically connected to the second additional conductor portion 73b.

The first electrode of each capacitor element 102 is electrically connected in parallel to the first conductor 72 through a conductive path that includes the first terminal member 103 and a conductive path that includes the first rear surface pattern 121. That is, the first electrode of each capacitor element 102 is electrically connected in parallel to the first conductor 72 through the two conductive paths that are provided on the small board 101 and are different from each other.

The second electrode of each capacitor element 102 is electrically connected in parallel to the second conductor 73 through a conductive path that includes the second terminal member 104 and a conductive path that includes the second rear surface pattern 122. That is, the second electrode of each capacitor element 102 is electrically connected in parallel to the second conductor 73 through the two conductive paths that are provided on the small board 101 and are different from each other.

The in-vehicle power conversion device 1 includes a resin member 105 that has an electrical insulating property. The first conductor 72, the second conductor 73, and the nuts 141a, 142a, 143a, and 144a are integrated with one another as a molded member through intermediation of the resin member 105. The first conductor 72 and the second conductor 73 are provided on the resin member 105 while the first conductor 72 and the second conductor 73 are electrically insulated from each other. A top surface of each of the first conductor portion 72a for terminal, the first additional conductor portion 72b, the second conductor portion 73a for terminal, and the second additional conductor portion 73b is exposed from the resin member 105.

The smoothing capacitor 7 is mounted to the molded member through tightening of the screws 141b, 142b, 143b, and 144b to the nuts 141a, 142a, 143a, and 144a, respectively.

The first conductor 72 is electrically connected to the smoothing coil 6 illustrated in FIG. 1. The second conductor 73 is electrically connected to the rectifier circuit 4 and the housing 14 illustrated in FIG. 1. The molded member to which the smoothing capacitor 7 is mounted is accommodated in the housing 14.

In the above-mentioned in-vehicle power conversion device 1, the first mechanical connection portion configured to fix the smoothing capacitor main body 71 to the first conductor 72 functions as the additional electrical connection portion electrically connected to the first conductor 72. Consequently, the smoothing capacitor main body 71 can electrically be connected to the first conductor 72 not only via the first electrical connection portion, but also via the first mechanical connection portion. As a result, an impedance between each capacitor element 102 and the first conductor 72 can be reduced, thereby being capable of suppressing a decrease in performance of the smoothing capacitor 7.

Moreover, the second mechanical connection portion configured to fix the smoothing capacitor main body 71 to the second conductor 73 functions as the additional electrical connection portion electrically connected to the second conductor 73. Consequently, the smoothing capacitor main body 71 can electrically be connected to the second conductor 73 not only via the second electrical connection portion, but also via the second mechanical connection portion. As a result, an impedance between each capacitor element 102 and the second conductor 73 can be reduced, thereby being capable of further suppressing the decrease in performance of the smoothing capacitor 7.

Moreover, the first conductor 72 and the second conductor 73 are integrated with each other through intermediation of the resin member 105. Consequently, the first conductor 72 and the second conductor 73 can be treated as an integrated body. As a result, manufacturing of the in-vehicle power conversion device 1 can be facilitated. Moreover, the in-vehicle power conversion device 1 can be downsized.

Further, the smoothing capacitor main body 71 includes the small board 101 and the plurality of capacitor elements 102 mounted to the small board 101. Consequently, the plurality of capacitor elements 102 can efficiently be arranged on the small board 101, thereby being capable of further downsizing the smoothing capacitor 7.

Moreover, the first terminal member 103 is electrically connected to the first conductor 72 by the screw 141*b*. The second terminal member 104 is electrically connected to the second conductor 73 by the screw 142*b*. Consequently, the first terminal member 103 can more reliably be connected to the first conductor 72, thereby being capable of increasing reliability of a connection state of the first terminal member 103 to the first conductor 72. Moreover, the second terminal member 104 can more reliably be connected to the second conductor 73, thereby being capable of increasing reliability of a connection state of the second terminal member 104 to the second conductor 73.

Further, the first conductor 72 is electrically connected to the smoothing coil 6 and the output terminal 13. Still further, the second conductor 73 is electrically connected to the rectifier circuit 4 and the housing 14. Consequently, an impedance between each of the smoothing coil 6 and the rectifier circuit 4, and the smoothing capacitor 7 can effectively be reduced, thereby being capable of effectively smoothing the pulsating voltage supplied from the rectifier circuit 4.

Second Embodiment

Figure 3:
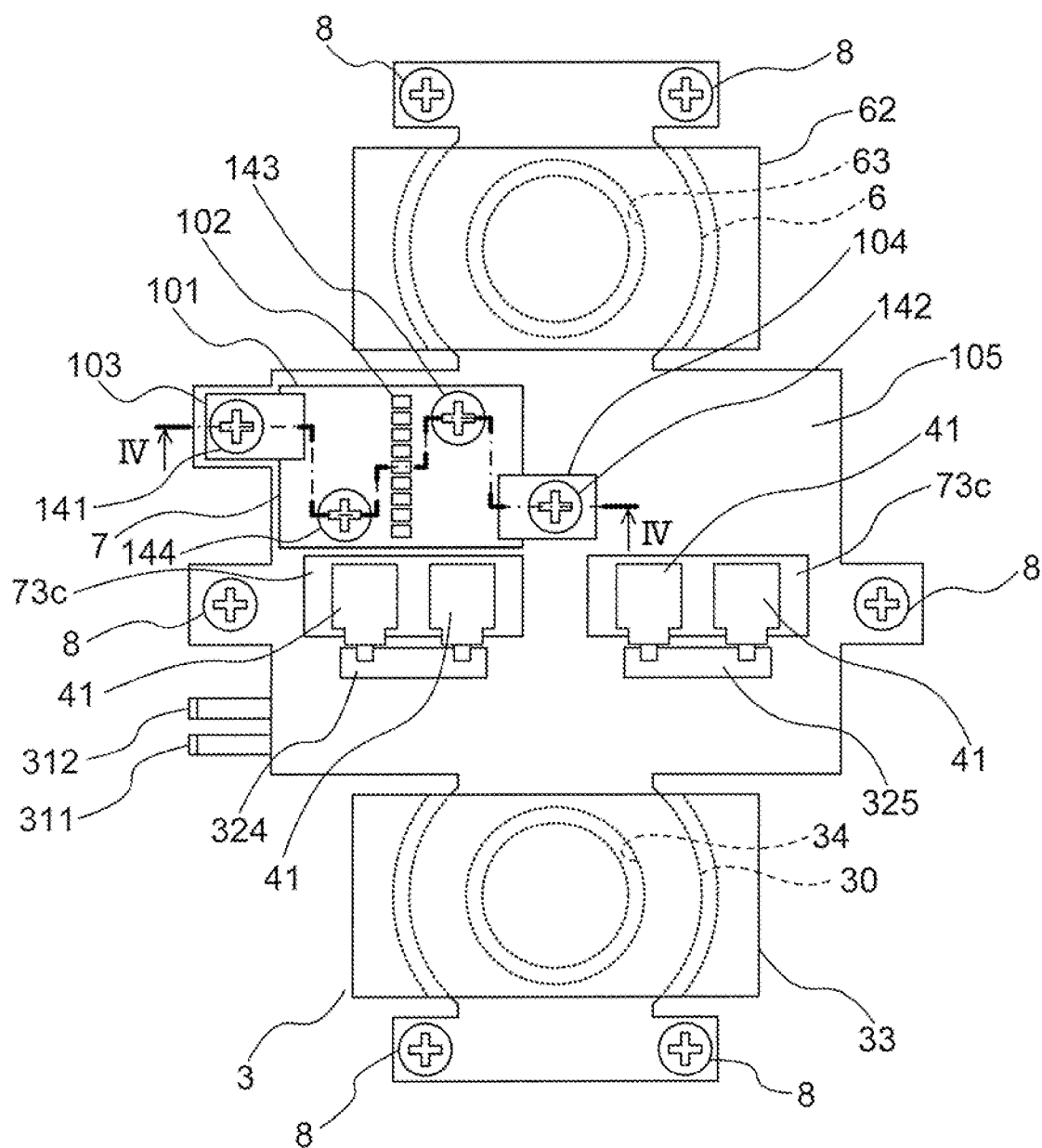
FIG. 3 is a top view for illustrating a main part of an in-vehicle power conversion device according to a second embodiment of the present invention.
Figure 4:
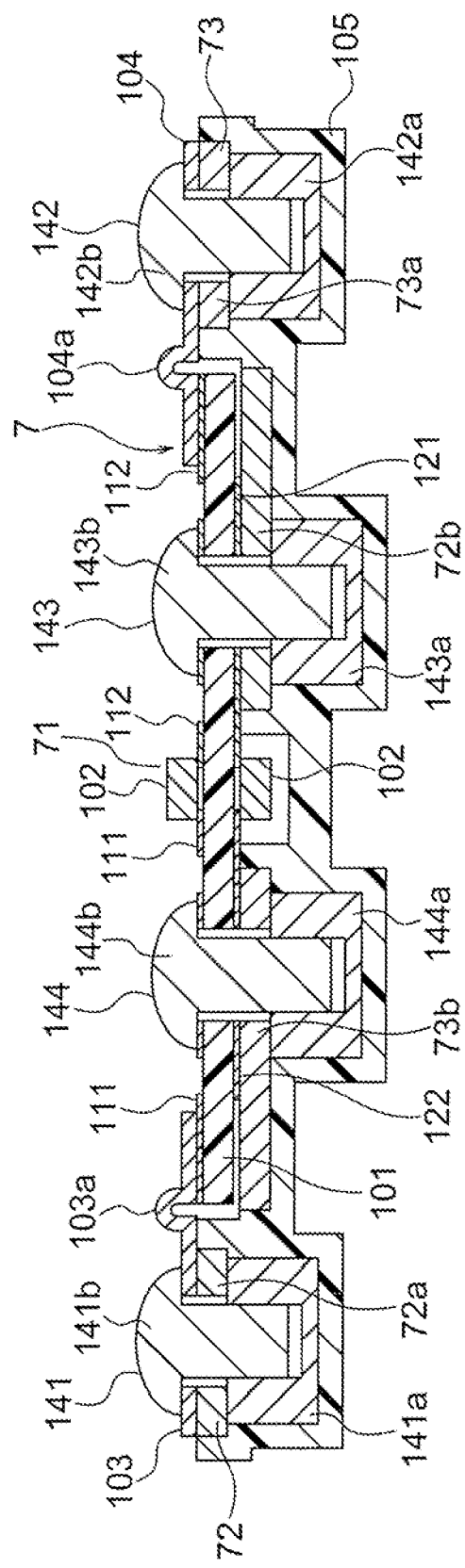
FIG. 4 is a cross-sectional view taken along the line IV-IV of FIG. 3.

FIG. 3 is a top view for illustrating a main part of an in-vehicle power conversion device according to a second embodiment of the present invention. Moreover, FIG. 4 is a cross-sectional view taken along the line IV-IV of FIG. 3. The primary winding 31 and the secondary winding 32 of the transformer 3 form a transformer winding portion 30 under a state in which the primary winding 31 and the secondary winding 32 are stacked on each other. The transformer winding portion 30 is formed by stacking a plurality of conductors each formed by punching a copper plate into an annular shape, and molding the plurality of conductors with the resin member 105.

The resin member 105 has formed therein a through hole 34 which passes through the transformer winding portion 30 in a direction along which the primary winding 31 and the secondary winding 32 are stacked on each other. The transformer core 33 is combined with the transformer winding portion 30 while a part of the transformer core 33 is passing through the through hole 34. The transformer core 33 forms a magnetic circuit through which a magnetic flux generated by supply of current to the transformer winding portion 30 passes.

The smoothing coil 6 is formed by stacking a plurality of conductors each formed by punching a copper plate into an annular shape, and molding the plurality of conductors with the resin member 105. A smoothing coil core 62 is combined with the smoothing coil 6.

The resin member 105 has formed therein a through hole 63 which passes through the smoothing coil 6 in a direction along which the plurality of conductors are stacked on one another. The smoothing coil core 62 is combined with the smoothing coil 6 while a part of the smoothing coil core 62 is passing through the through hole 63. The smoothing coil core 62 forms a magnetic circuit through which a magnetic flux generated by supply of current to the smoothing coil 6 passes.

A part of the smoothing coil 6 and the first conductor 72 are formed of a single conductive member. In this example, one conductor of the smoothing coil 6 and the first conductor 72 are formed of the single conductive member.

The transformer winding portion 30, the smoothing coil 6, the first conductor 72, the second conductor 73, and the nuts 141*a*, 142*a*, 143*a*, and 144*a* are integrated with one another as a molded member through intermediation of the resin member 105 that has the electrical insulating property. The molded member is accommodated in the housing 14. Moreover, the molded member is fixed to the housing 14 by a plurality of screws 8.

The transformer winding portion 30 includes a first primary winding end portion 311, a second primary winding end portion 312, a first secondary winding end portion 324, and a second secondary winding end portion 325. The first primary winding end portion 311 and the second primary winding end portion 312 each protrude from the primary winding 31 to the outside of the resin member 105. The first secondary winding end portion 324 and the second secondary winding end portion 325 each extend from the secondary winding 32.

Each of the first primary winding end portion 311 and the second primary winding end portion 312 is connected to the control board (not shown) by soldering. Each of the first secondary winding end portion 324 and the second secondary winding end portion 325 includes a region exposed to the outside of the resin member 105.

The second conductor 73 further includes a pair of second conductor exposed portions 73*c*. Each of the second conductor exposed portions 73*c* is exposed from the resin member 105 at a position adjacent to each of the exposed positions of the first secondary winding end portion 324 and the second secondary winding end portion 325.

To each of the second conductor exposed portions 73c, two rectifier diodes 41 are mounted by soldering. Each rectifier diode 41 is electrically connected to the second conductor exposed portion 73c and the first secondary winding end portion 324 or the second secondary winding end portion 325.

A part of the second conductor 73 is exposed from the resin member 105 on a surface of the molded member on the rear side. The portion of the second conductor 73 exposed on the rear side of the molded member is thermally connected to the housing 14 through intermediation of grease that has thermal conductivity. As a result, heat generated in each rectifier diode 41 is dissipated to the housing 14 through the second conductor 73.

At a stage of a subassembly in which the smoothing capacitor 7 is mounted to the molded member, the transformer core 33 and the smoothing coil core 62 are temporarily fixed to the molded member through use of adhesive tapes. The transformer core 33 and the smoothing coil core 62 are fixed to the housing under a state in which the transformer core 33 and the smoothing coil core 62 are pressed by, for example, a plate spring.

In this embodiment, as illustrated in FIG. 4, the position of the first mechanical connection portion that includes the first rear surface pattern 121 and the first body fixture 143 and the position of the second mechanical connection portion that includes the second rear surface pattern 122 and the second body fixture 144 are positions opposite to those in the first embodiment. Moreover, in this embodiment, the position of the first additional conductor portion 72b and the position of the second additional conductor portion 73b are positions opposite to those in the first embodiment.

As a result, in the smoothing capacitor 7, at least a part of the first rear surface pattern 121 is opposed to the second front surface pattern 112 across the small board 101. The first rear surface pattern 121 is electrically connected to the first front surface pattern 111 through a through via (not shown) formed in the small board 101.

Moreover, in the smoothing capacitor 7, at least a part of the second rear surface pattern 122 is opposed to the first front surface pattern 111 across the small board 101. The second rear surface pattern 122 is electrically connected to the second front surface pattern 112 through a through via (not shown) formed in the small board 101.

In the portion across which the first front surface pattern 111 and the second rear surface pattern 122 are opposed to each other, a direction of a current that flows through the first front surface pattern 111 and a direction of a current that flows through the second rear surface pattern 122 are opposite to each other. As a result, at least a part of a magnetic flux generated by the current that flows through the first front surface pattern 111 is canceled out by a magnetic flux generated by a current that flows through the second rear surface pattern 122. That is, in the smoothing capacitor 7, a positional relationship between the first electrical connection portion and the second mechanical connection portion is set such that at least a part of the magnetic flux generated by the current that flows through the first electrical connection portion is canceled out by the magnetic flux generated by the current that flows through the second mechanical connection portion.

Further, in the portion across which the second front surface pattern 112 and the first rear surface pattern 121 are opposed to each other, a direction of a current that flows through the second front surface pattern 112 and a direction of a current that flows through the first rear surface pattern 121 are opposite to each other. As a result, at least a part of a magnetic flux generated by the current that flows through the second front surface pattern 112 is canceled out by a magnetic flux generated by a current that flows through the first rear surface pattern 121. That is, in the smoothing capacitor 7, a positional relationship between the second electrical connection portion and the first mechanical connection portion is set such that at least a part of the magnetic flux generated by the current that flows through the second electrical connection portion is canceled out by the magnetic flux generated by the current that flows through the first mechanical connection portion. The other configurations are the same as those in the first embodiment.

In the above-mentioned in-vehicle power conversion device 1, the positional relationship between the second electrical connection portion and the first mechanical connection portion is set such that at least a part of the magnetic flux generated by the current is canceled out. Consequently, the impedance between each capacitor element 102 and the second conductor 73 can further be reduced. As a result, the decrease in performance of the smoothing capacitor 7 can further be suppressed.

Moreover, the positional relationship between the first electrical connection portion and the second mechanical connection portion is set such that at least a part of the magnetic flux generated by the current is canceled out. Consequently, the impedance between each capacitor element 102 and the first conductor 72 can be reduced. As a result, the decrease in performance of the smoothing capacitor 7 can further be suppressed.

Moreover, the through hole 34 into which the transformer core 33 is inserted and the through hole 63 into which the smoothing coil core 62 is inserted are formed in the resin member 105. Consequently, the transformer core 33 and the smoothing coil core 62 can easily be mounted to the molded member that integrates the transformer winding portion 30, the smoothing coil 6, the first conductor 72, the second conductor 73, and the nuts 141a, 142a, 143a, and 144a to one another through intermediation of the resin member 105. As a result, the molded member, the transformer core 33, and the smoothing coil core 62 can be treated as a single subassembly, and the manufacturing of the in-vehicle power conversion device 1 can further be facilitated.

Moreover, each of the rectifier diodes 41 is mounted, by soldering, to the second conductor 73 provided on the resin member 105. Consequently, it is not required to provide an additional step, for example, welding for connecting each of the rectifier diodes 41 to the conductor. As a result, the manufacturing of the in-vehicle power conversion device 1 can further be facilitated.

Moreover, the second conductor 73 to which each rectifier diode 41 is mounted by soldering is electrically connected to the housing 14. Consequently, the length of a conductive path between the smoothing capacitor 7 and the rectifier circuit 4 can be reduced. As a result, the impedance between each capacitor element 102 and the rectifier circuit 4 can further be reduced. Accordingly, the decrease in performance of the smoothing capacitor 7 can further be suppressed.

Moreover, a part of the smoothing coil 6 and the first conductor 72 are formed of the single conductive member. Consequently, an unnecessary connection portion in the smoothing coil 6 and the first conductor 72 can be reduced. As a result, the in-vehicle power conversion device 1 can be downsized.

In the above-mentioned example, a part of the smoothing coil 6 and the first conductor 72 are formed of the single conductive member. However, the whole smoothing coil 6 and the first conductor 72 may be formed of a single conductive member.

Moreover, in the above-mentioned example, the transformer winding portion 30 and the smoothing coil 6 are integrated with each other through intermediation of the resin member 105. However, one of the transformer winding portion 30 and the smoothing coil 6 may be provided on the resin member 105, and the other thereof may be independent of the resin member 105. Even with this configuration, one of the transformer winding portion 30 or the smoothing coil 6 can be included in the molded member, and the manufacturing of the in-vehicle power conversion device 1 can thus further be facilitated.

Third Embodiment

Figure 5:
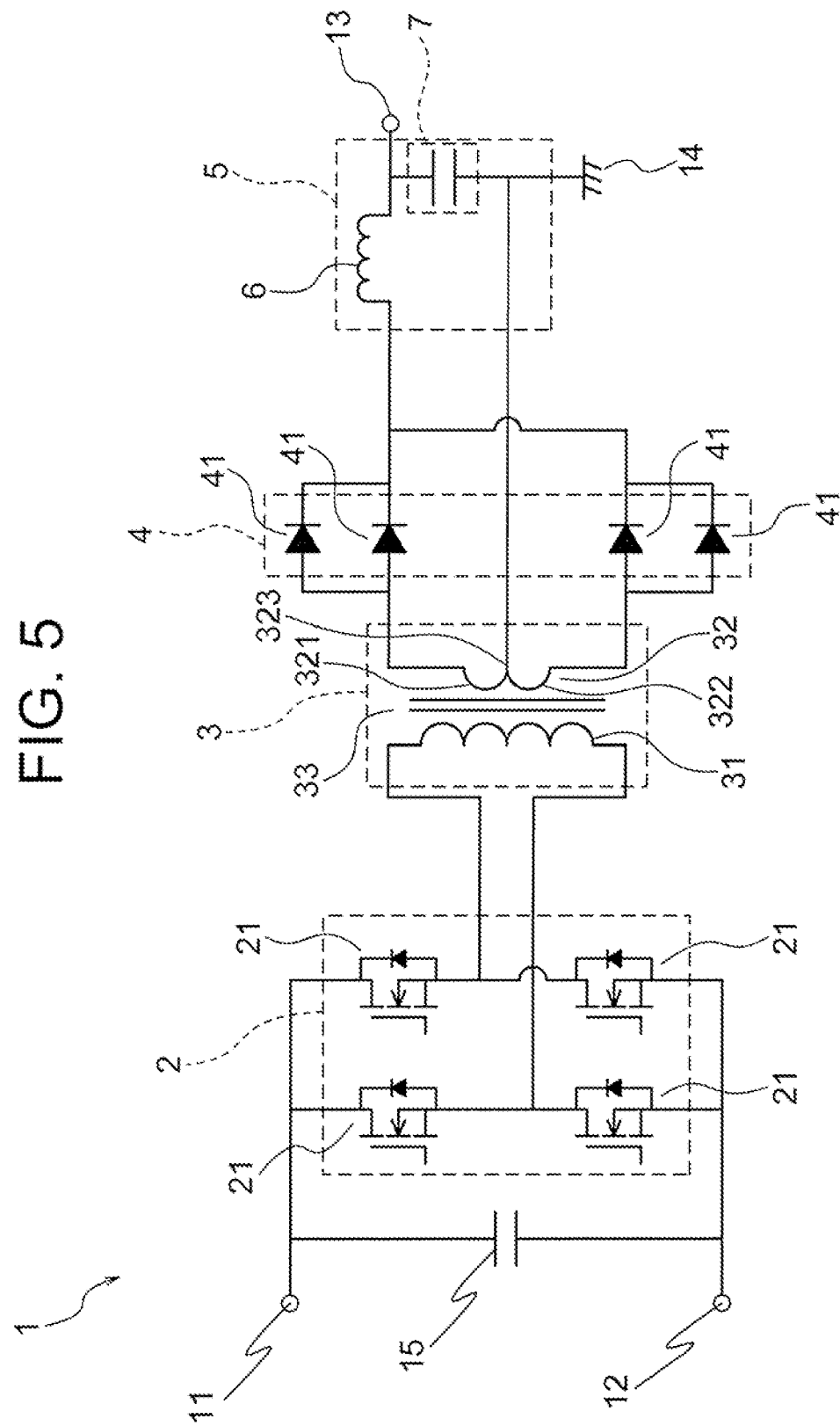
FIG. 5 is a circuit diagram for illustrating an in-vehicle power conversion device according to a third embodiment of the present invention.

FIG. 5 is a circuit diagram for illustrating an in-vehicle power conversion device according to a third embodiment of the present invention. The smoothing coil 6 is electrically connected between the rectifier circuit 4 and the output terminal 13. The smoothing capacitor 7 is electrically connected between the output terminal 13 and the housing 14. Moreover, the smoothing capacitor 7 is electrically connected between the center tap portion 323 of the secondary winding 32 and the output terminal 13.

The first conductor 72 is electrically connected to the smoothing coil 6 and the output terminal 13. The second conductor 73 is electrically connected to the center tap portion 323 of the secondary winding 32 and the housing 14.

In the rectifier circuit 4, the direction of each rectifier diode 41 serving as the secondary-side semiconductor element is opposite to that in the first embodiment. That is, the cathode terminal of each rectifier diode 41 is electrically connected to the smoothing coil 6. The other configurations are the same as those in the first embodiment.

Even with the above-mentioned circuit form, the same effects as those in the first embodiment can be provided.

In the above-mentioned example, as in the second embodiment, the molded member may be formed by integrating, through intermediation of the resin member 105, the transformer winding portion 30, the smoothing coil 6, the first conductor 72, the second conductor 73, and the nuts 141a, 142a, 143a, and 144a to one another.

When the molded member is to be formed, at least a part of the smoothing coil 6 and the first conductor 72 may be formed of a single conductive member. With this configuration, an unnecessary connection portion in the smoothing coil 6 and the first conductor 72 can be reduced, thereby being capable of downsizing the in-vehicle power conversion device 1.

Further, when the molded member is to be formed, at least a part of the secondary winding 32 and the second conductor 73 may be formed of a single conductive member. With this configuration, an unnecessary connection portion in the secondary winding 32 and the second conductor 73 can be reduced, thereby being capable of downsizing the in-vehicle power conversion device 1.

Fourth Embodiment

At least one of the switching element 21 serving as the primary-side semiconductor element or the rectifier diode 41 serving as the secondary-side semiconductor element may be a wide bandgap semiconductor. In a fourth embodiment of the present invention, each of the switching element 21 and the rectifier diode 41 is a wide bandgap semiconductor. The other configurations are the same as those in the second embodiment.

Figure 6:
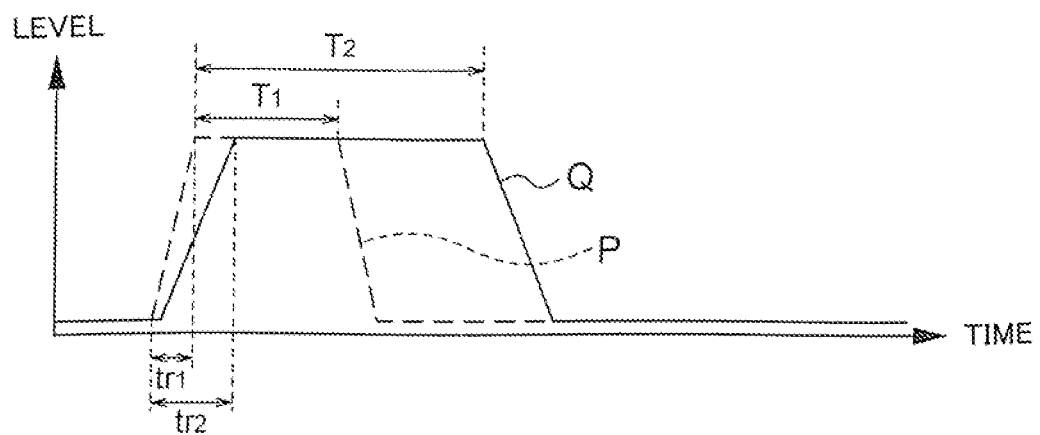
FIG. 6 is a graph for showing a relationship between a level of a drive pulse and time in each of a wide bandgap semiconductor in a fourth embodiment of the present invention and a normal semiconductor in a comparative example.

FIG. 6 is a graph for showing a relationship between a level of a drive pulse and time in each of a wide bandgap semiconductor P in the fourth embodiment of the present invention and a normal semiconductor Q in a comparative example. Moreover, FIG. 7 is a graph for showing a relationship between the level of the drive pulse and a frequency in each of the wide bandgap semiconductor P in the fourth embodiment of the present invention and the semiconductor Q in the comparative example.

In the in-vehicle power conversion device 1, as the speed and the frequency increase, an application period T of the drive pulse in the semiconductor, and a rise period tr of the drive pulse in the semiconductor decrease. As shown in FIG. 6, an application period T1 of the drive pulse and a rise period tr1 of the drive pulse in the wide bandgap semiconductor P can be reduced compared with an application period T2 of the drive pulse and a rise period tr2 of the drive pulse in the semiconductor Q in the comparative example, respectively.

Figure 7:
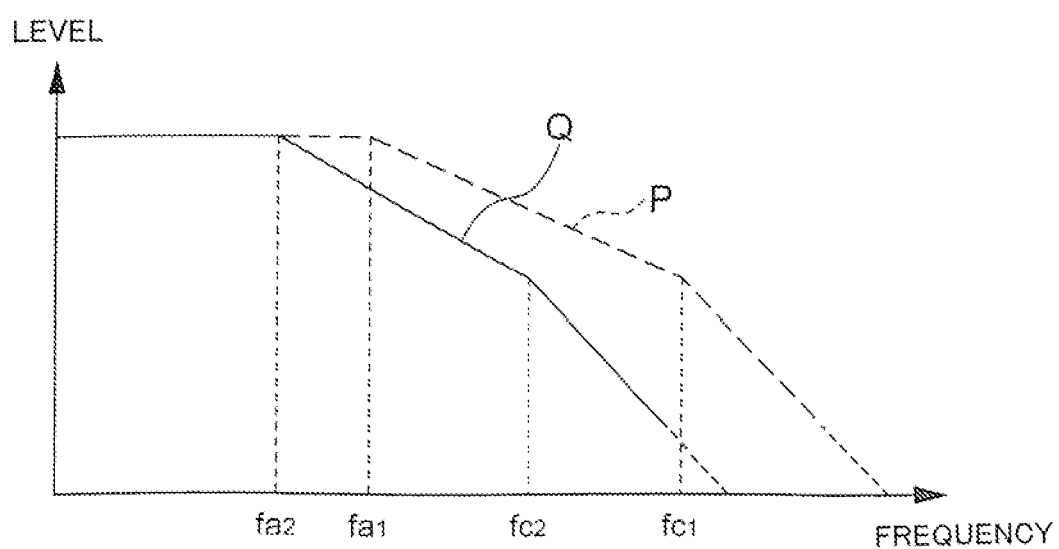
FIG. 7 is a graph for showing a relationship between the level of the drive pulse and a frequency in each of the wide bandgap semiconductor in the fourth embodiment of the present invention and the semiconductor in the comparative example.

In this case, a frequency fa at which a high-frequency spectrum starts to attenuate at 20 dB/decade is given by "$fa=1/(n\times T)$." Moreover, a frequency fc at which the high-frequency spectrum starts to attenuate at 40 dB/decade is given by "$fc=1/(n\times tr)$." Thus, as shown in FIG. 7, frequencies fa1 and fc1 in the wide bandgap semiconductor P are higher than frequencies fa2 and fc2 in the semiconductor Q in the comparative example, respectively. That is, as the application period T1 of the drive pulse and the rise period tr1 of the drive pulse in the wide bandgap semiconductor P decrease, the frequencies fa1 and fc1 increase.

A noise level increases as the frequencies fa1 and fc1 increase. However, in the fourth embodiment, the decrease in performance of the smoothing capacitor 7 is suppressed, and the noise due to the increases in the frequencies fa1 and fc1 can thus be reduced. Accordingly, in the fourth embodiment, the wide bandgap semiconductor is used for each of the switching element 21 and the rectifier diode 41, thereby being capable of easily attaining the high-frequency drive, and the magnetic components such as the transformer core 33 and the smoothing coil core 62 can thus be downsized.

In each of the above-mentioned embodiments, the smoothing capacitor main body 71 is fixed to the first additional conductor portion 72b by the first mechanical connection portion that functions as the additional electrical connection portion. However, the first mechanical connection portion and the first additional conductor portion 72b may be omitted. Even with this configuration, the impedance between the second electrode of each capacitor element 102 and the second conductor 73 can be reduced by the second conductor 73, and the decrease in performance of each capacitor element 102 can be suppressed.

Moreover, the smoothing capacitor main body 71 is fixed to the second additional conductor portion 73b by the second mechanical connection portion that functions as the additional electrical connection portion. However, the second mechanical connection portion and the second additional conductor portion 73b may be omitted. Even with this configuration, the impedance between the first electrode of each capacitor element 102 and the first conductor 72 can be reduced by the first conductor 72, and the decrease in performance of each capacitor element 102 can be suppressed.

That is, as long as the smoothing capacitor main body 71 is fixed to the first conductor 72 or the second conductor 73 by the mechanical connection portion that functions as the additional electrical connection portion, the decrease in performance of each capacitor element 102 can be suppressed.

Moreover, in each of the above-mentioned embodiments, the first terminal member 103 includes the kink portion 103a. However, the first terminal member 103 may not include the kink portion 103a.

Moreover, in each of the above-mentioned embodiments, the second terminal member 104 includes the kink portion 104a. However, the second terminal member 104 may not include the kink portion 104a.

Moreover, in each of the above-mentioned embodiments, the electrical connection portion configured to electrically connect, through use of the nut 141a and the screw 141b, the first terminal member 103 to the first conductor portion 72a for terminal is used as the first electrical connection portion. However, an electrical connection portion configured to electrically connect the first terminal member 103 to the first conductor portion 72a for terminal through intermediation of a solder portion may be used as the first electrical connection portion.

Moreover, in each of the above-mentioned embodiments, the electrical connection portion configured to electrically connect, through use of the nut 142a and the screw 142b, the second terminal member 104 to the second conductor portion 73a for terminal is used as the second electrical connection portion. However, an electrical connection portion configured to electrically connect the second terminal member 104 to the second conductor portion 73a for terminal through intermediation of a solder portion may be used as the second electrical connection portion.

Moreover, the type of the rectifier circuit 4 is not limited to the type used in each of the above-mentioned embodiments. For example, a rectifier circuit of the current-doubler type can be used as the rectifier circuit 4. Further, the type of the inverter circuit 2 is also not limited to the type used in each of the above-mentioned embodiments.

REFERENCE SIGNS LIST 1 power conversion device, 3 transformer, 4 rectifier circuit, 5 smoothing circuit, 6 smoothing coil, 7 smoothing capacitor, 21 switching element (primary-side semiconductor element), 31 primary winding, 32 secondary winding, transformer core, 41 rectifier diode (secondary-side semiconductor element), 62 smoothing coil core, 71 smoothing capacitor main body, 72 first conductor, 73 second conductor, 101 small board, 102 capacitor element, 103 first terminal member, 104 second terminal member, 105 resin member, 121 first rear surface pattern, 122 second rear surface pattern, 141 first terminal fixture, 142 second terminal fixture, 143 first body fixture, 144 second body fixture

The invention claimed is:

1. An in-vehicle power conversion device, comprising:
a transformer including a primary winding and a secondary winding;
an inverter circuit configured to supply a current to the primary winding;
a rectifier circuit configured to rectify an AC voltage generated in the secondary winding into a pulsating voltage;
a smoothing circuit which includes a smoothing coil and a smoothing capacitor, and is configured to smooth the pulsating voltage rectified by the rectifier circuit;
a first conductor and a second conductor to which the smoothing capacitor is electrically connected;
a resin member configured to integrate the first conductor and the second conductor with each other under a state in which the first conductor and the second conductor are insulated from each other; and
a housing which is conductive,
wherein the smoothing capacitor includes a first electrical connection portion, a second electrical connection portion, a mechanical connection portion, and a smoothing capacitor main body in which the first electrical connection portion, the second electrical connection portion, and the mechanical connection portion are provided,
wherein the first electrical connection portion is electrically connected to the first conductor,
wherein the second electrical connection portion is electrically connected to the second conductor,
wherein the mechanical connection portion functions as an additional electrical connection portion configured to fix the smoothing capacitor main body to the first conductor or the second conductor so as to be electrically connected to a fixing destination of the smoothing capacitor main body,
wherein, in the smoothing capacitor, a positional relationship between the first electrical connection portion or the second electrical connection portion and the mechanical connection portion is set such that at least a part of a magnetic flux generated by a first current that flows through the first electrical connection portion or the second electrical connection portion is canceled out by a magnetic flux generated by a second current that flows through the mechanical connection portion,
wherein the smoothing capacitor main body includes a small board other than the control board,
wherein the mechanical connection portion is opposed to the first electrical connection portion or the second electrical connection portion across the small board, and
wherein the mechanical connection portion and the first electrical connection portion or the second electrical connection portion are provided such that a first direction of the first current flowing through the first electrical connection portion or the second electrical connection portion and a second direction of the second current flowing through the mechanical connection portion are at least partially opposite each other.

2. The in-vehicle power conversion device according to claim 1, wherein the smoothing capacitor main body includes a capacitor element mounted to the small board.

3. The in-vehicle power conversion device according to claim 2,
wherein the first electrical connection portion includes a first terminal member provided on the small board, and a screw configured to connect the first terminal member to the first conductor, and
wherein the second electrical connection portion includes a second terminal member provided on the small board, and a screw configured to connect the second terminal member to the second conductor.

4. The in-vehicle power conversion device according to claim 1,
wherein the rectifier circuit includes a secondary-side semiconductor element, and
wherein the resin member has provided therein a conductor to which the secondary-side semiconductor element is mounted by soldering.

5. The in-vehicle power conversion device according to claim 4,
wherein the conductor to which the secondary-side semiconductor element is mounted by soldering is the second conductor, and
wherein the second conductor is electrically connected to the housing.

6. The in-vehicle power conversion device according to claim 1, wherein at least a part of the secondary winding and the second conductor are formed of a single conductive member.

7. The in-vehicle power conversion device according to claim 1, wherein at least a part of the smoothing coil and the first conductor are formed of a single conductive member.

8. The in-vehicle power conversion device according to claim 1,
wherein the transformer includes a transformer core configured to form a magnetic circuit of the primary winding and the secondary winding,
wherein the smoothing circuit includes a smoothing coil core configured to form a magnetic circuit of the smoothing coil, and
wherein the resin member has formed therein a through hole into which at least one of the transformer core or the smoothing coil core is inserted.

9. The in-vehicle power conversion device according to claim 1,
wherein the inverter circuit includes a primary-side semiconductor element,
wherein the rectifier circuit includes a secondary-side semiconductor element, and
wherein at least one of the primary-side semiconductor element or the secondary-side semiconductor element is a wide bandgap semiconductor.

10. The in-vehicle power conversion device of claim 1, wherein a cancellation is achieved by the current that flows through the first electrical connection portion, wherein the current that flows through the first electrical connection portion flows through a first through via in a board secured by the mechanical connection portion.

11. An in-vehicle power conversion device, comprising:
a transformer including a primary winding and a secondary winding;
an inverter circuit configured to supply a current to the primary winding;
a rectifier circuit configured to rectify an AC voltage generated in the secondary winding into a pulsating voltage;
a smoothing circuit which includes a smoothing coil and a smoothing capacitor, and is configured to smooth the pulsating voltage rectified by the rectifier circuit;
a first conductor and a second conductor to which the smoothing capacitor is electrically connected;
a resin member configured to integrate the first conductor and the second conductor with each other under a state in which the first conductor and the second conductor are insulated from each other; and
a housing which is conductive,
wherein the smoothing capacitor includes a first electrical connection portion, a second electrical connection portion, a mechanical connection portion, and a smoothing capacitor main body in which the first electrical connection portion, the second electrical connection portion, and the mechanical connection portion are provided,
wherein the first electrical connection portion is electrically connected to the first conductor,
wherein the second electrical connection portion is electrically connected to the second conductor,
wherein the mechanical connection portion functions as an additional electrical connection portion configured to fix the smoothing capacitor main body to the first conductor or the second conductor so as to be electrically connected to a fixing destination of the smoothing capacitor main body,
wherein, in the smoothing capacitor, a positional relationship between the first electrical connection portion or the second electrical connection portion and the mechanical connection portion is set such that at least a part of a magnetic flux generated by a current that flows through the first electrical connection portion or the second electrical connection portion is canceled out by a magnetic flux generated by a current that flows through the mechanical connection portion,
wherein a cancellation is achieved by the current that flows through the first electrical connection portion, wherein the current that flows through the first electrical connection portion flows through a first through via in a board secured by the mechanical connection portion,
wherein, in the smoothing capacitor, at least a part of a first rear surface pattern is opposed to a second front surface pattern across the board, the first rear surface pattern is electrically connected to a first front surface pattern through the first through via formed in the board, and
wherein, in the smoothing capacitor, at least a part of a second rear surface pattern is opposed to the first front surface pattern across the board, the second rear surface pattern is electrically connected to the second front surface pattern through a second through via formed in the board.

* * * * *